March 29, 1966 R. F. COBAUGH 3,243,757

ELECTRICAL CONNECTIONS

Filed Jan. 20, 1964 5 Sheets-Sheet 1

March 29, 1966 R. F. COBAUGH 3,243,757

ELECTRICAL CONNECTIONS

Filed Jan. 20, 1964 5 Sheets-Sheet 2

March 29, 1966 R. F. COBAUGH 3,243,757

ELECTRICAL CONNECTIONS

Filed Jan. 20, 1964 5 Sheets-Sheet 3

March 29, 1966 R. F. COBAUGH 3,243,757

ELECTRICAL CONNECTIONS

Filed Jan. 20, 1964 5 Sheets-Sheet 5

United States Patent Office 3,243,757
Patented Mar. 29, 1966

3,243,757
ELECTRICAL CONNECTIONS
Robert F. Cobaugh, Hershey, Pa., assignor to AMP Incorporated, Harrisburg, Pa.
Filed Jan. 20, 1964, Ser. No. 338,663
3 Claims. (Cl. 339—97)

This invention relates to electrical connections and to terminal clips for making such connections between conductors and terminal posts. This application is a continuation-in-part of my previously filed application Serial Number 171,074, filed February 5, 1962.

A common method of making electrical connections is to provide a terminal post to which a conductor may be connected by any one of several preexisting methods. For example, in the wiring of complex electronic circuits for computers or other relatively complex devices, panelboards are frequently used having a multiplicity of terminal posts mounted thereon in accordance with a coordinate grid system. The wiring pattern for the device is then achieved by electrically connecting selected posts by means of suitable conductors. In accordance with prior art practice the individual conductors may be connected to the individual posts by, for example, soldering, by welding, and by wrap type connections in which the end of the conductor is wrapped around the post.

Terminal posts are also frequently used for less complex electrical devices such as motors, relays, automotive and aircraft equipment, and appliances. Many different sizes of posts are used although in a given piece of equipment, it is common to use one size for all connections.

The present invention relates generally to a terminal clip for forming electrical connections between terminal posts and conductors and to the electrical connections thus formed.

It is, therefore, an object of the present invention to provide an improved connection between a conductor and a terminal post. A further object is to provide a connecting device for forming connections between conductors and terminal posts. A still further object is to provide a connecting device for forming electrical conductor-to-post connections which can be used with different types of conductors including stranded wire, solid wire, wires insulated with conventional plastic or fiber insulations, wires insulated with varnish type insulations, uninsulated wire, tinsel wire, and flat conductor cable. A further object is to provide a device for making conductor-to-post connections which is amenable to usage with fully automatic and programed controlled wiring machines, with relatively simple power actuated tools, and with manually actuated hand tools. A further object is to provide an electrical connection which is substantially foolproof and secure but which can be readily broken when the occasion arises for repair or modification. A still further object is to provide an electrical connection and a conductor-to-post connecting device which is amenable to usage where the posts are spaced closely together.

These and other objects of the invention are achieved by means of a terminal clip having a web and having sidewalls extending from the sides thereof with means on the marginal portions of the side walls for engaging the post in a manner such that the clip can be moved axially onto the post and into embracing relationship therewith. In one embodiment, the post engaging means comprises curled-over marginal portions on the sidewalls so that after the clip is moved onto the post, the web is disposed against one side of the post while the edges of the sidewalls press against the opposite side. The clip is advantageously applied to the post by being moved over a suitable mandrel, past a transversely extending wire which extends into an opening in the mandrel, and onto the post in a manner such that the wire is dragged from the opening, over the surface of the mandrel and onto the post and is held between the surface of the post and the internal surface of the web after the clip comes to rest. Under many circumstances it is desirable to provide an outwardly cupped strain relief and insulation support device on the web at one end thereof and between the sidewalls so that the wire emerges through this insulation support from beneath the clip and is thereby protected against abrupt bending. The web of the clip may be substantially flat where solid wire is being connected to a post or may be bowed transversely of the clip axis where stranded wires are involved.

Other objects and attainments of the invention are disclosed in the following specification and in the attached drawing in which.

Figure 7:
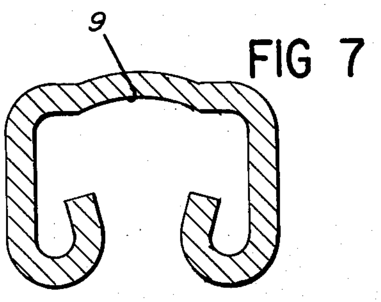
FIGURE 7 is a view taken along the lines 7—7 of FIGURE 5.

Referring first to FIGURES 4–8, one form of terminal clip 2 in accordance with the invention has a channel shaped cross section comprising web 4 and sidewalls 6 which extend from the longitudinal edges of the web. The longitudinal marginal edge portions of these sidewalls are reversely curled, as shown at 8, towards each other and towards the web so that the edges 10 of the sidewalls are opposed to the web. The web is provided with an outwardly cupped insulation support at one end which, in the embodiment of FIGURE 4, comprises a pair of struck-up flaps 12 which extend outwardly on opposite sides of the center line of the clip. This insulation support functions as a strain relief and gripping means for a conductor as described below. The leading edges of these flaps may be bevelled as shown at 14 for the purpose of centering the wire during movement of the clip over the mandrel. The web of the clip is outwardly arcuate in its center portions as shown in FIGURE 7 to provide an axially extending pocket 9 on its underside for centering the wire relative to the axis of the clip. A tab 16 is struck-up from the web along the edge which is adjacent to the rearward ends of the flaps 12. This tab provides a sloping lead-in surface for the wire extending from the flaps 12 towards the pocket 9 on the underside of the web. On each side of this struck-up tab 16, the web portions 18 are preferably bent downwardly so that they lie in the plane of the web rather than follow the arcuate bulge. These web portions 18 provide edges 20 which assist in the stripping of insulation from the wire in the manner described below.

Figure 4:
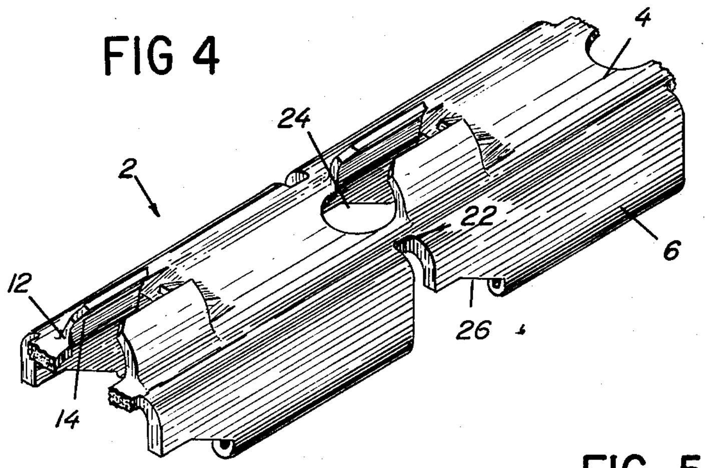
FIGURE 4 is a perspective view of two terminal clips in accordance with the invention connected together in end-to-end strip form.
Figure 5:
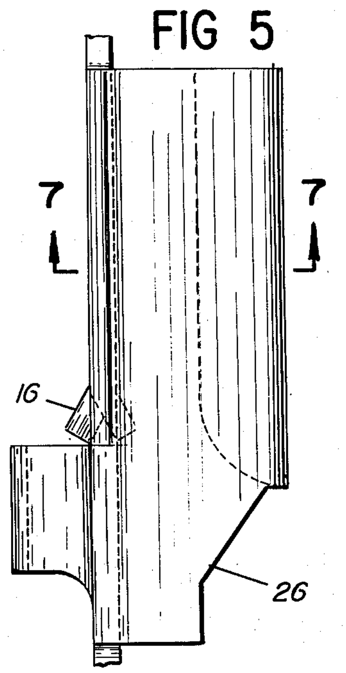
FIGURES 5 and 6 show the side and plan views respectively of a terminal clip of the type shown in FIGURE 4.
Figures 6, 8:
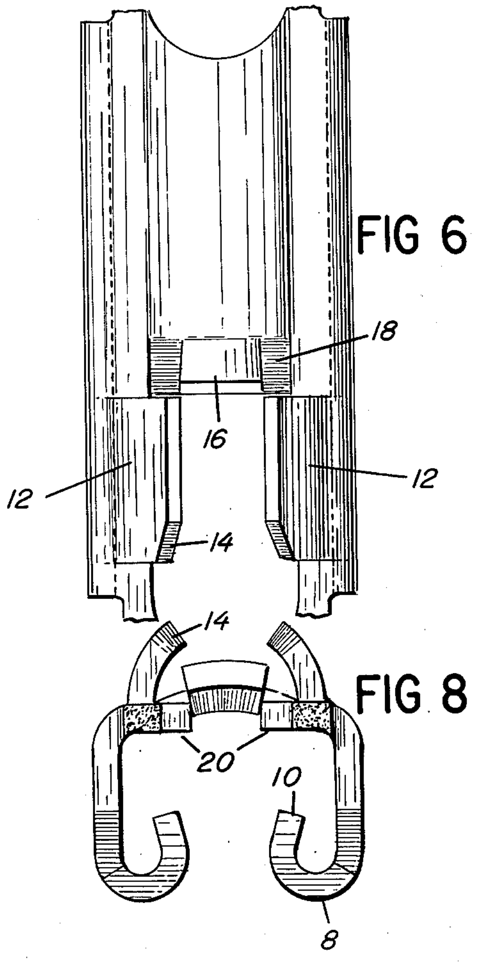
FIGURE 8 is an end view of the terminal clip of FIGURE 4.

Terminal clips of the type shown in FIGURE 4 are advantageously manufactured by die stamping and forming methods from sheet metal and are produced in end-to-end strip form with each clip being connected to the next adjacent clip as shown at 22. A circular opening 24 is punched out of the strip during manufacture so that when a clip is severed from the next adjacent clip, a relatively wide entrance is provided for the wire which entrance is in alignment with the gap between the flaps 12.

Figure 2:
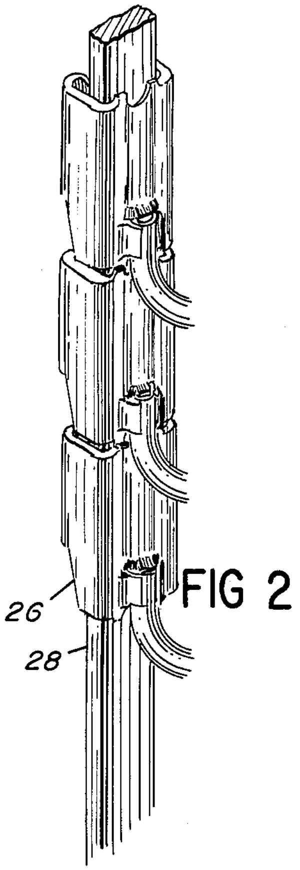
FIGURE 2 is a perspective view similar to FIGURE 1 but showing three conductors connected to one terminal post.
Figure 1:
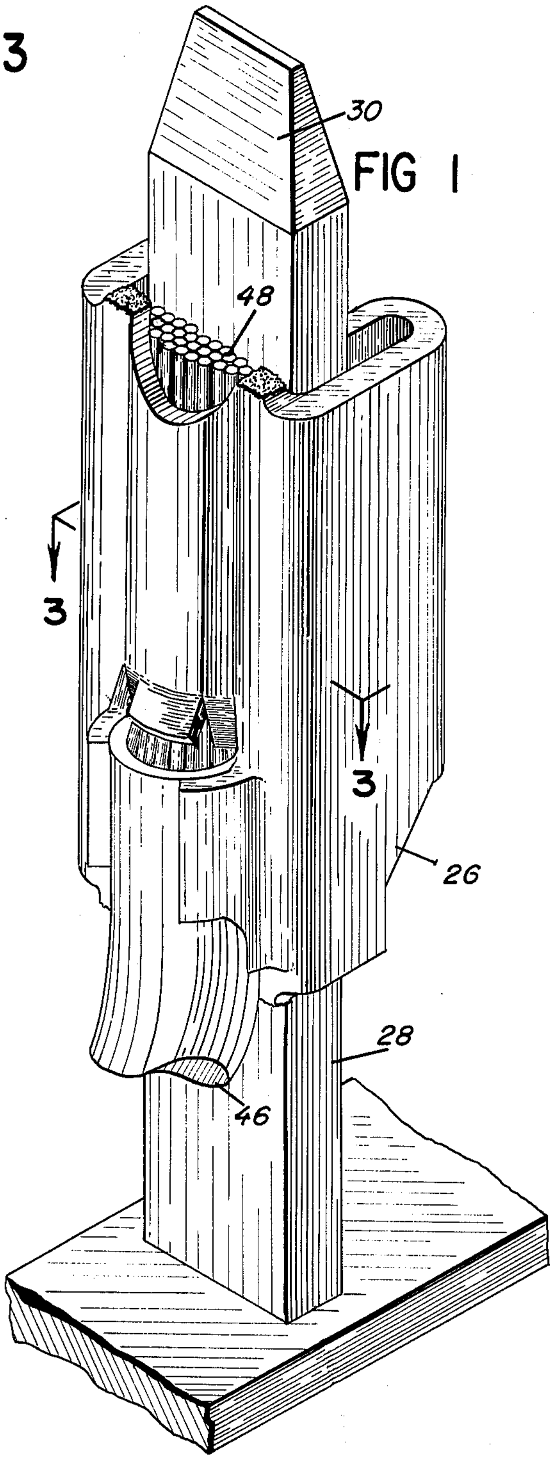
FIGURE 1 is a perspective view of an electrical connection between a terminal post and a multistranded wire in accordance with the invention.

Referring now to FIGURE 1, the terminal clip of the type shown in FIGURE 4 is adapted to be used in conjunction with a rectangular post 28 which has a uniform cross section throughout its length and which may have a pyramidal end 30. The upper end of the post is free and the lower end is fixed in a suitable panel board or the like. The thickness of the post is slightly greater than the distance between the edges 10 of the clip sidewalls and the internal surface of the web. The width of the post is ordinarily slightly less than the distance between the opposed faces of the sidewalls 6. The clip is applied to the post in a manner, described below, such that the insulation support flaps 12 are disposed remote from the end 30 of the post with the strands 48 of the wire held within the bulge 9 of the web and against a surface of the post 28. The insulated portion 46 of the wire which is external to the clip extends through the insulation support cavity defined by the flaps 12 and emerges from between these flaps as shown. The wire strands are thus clamped against a side of the post by the clip which embraces the post and holds the strands against its surface. The wire thus extends towards the fixed (i.e. lower) end of the post and emerges from confined relationship at this lower end of the clip. As shown in FIGURE 2, a plurality of such clips can be applied to a single post since the length of an individual clip will usually be only a fraction of the length of the post. In each electrical connection to the post 28, the wire thus emerges from confined relationship at the end of its associated clip which is proximate to the fixed end or base of the post.

The sidewalls are preferably cut away as shown at 26 on each side of the flaps 12. This feature is of importance where numerous electrical connections are made among an array of terminal posts arranged on a panelboard. Under such circumstances, numerous wires will extend between the posts and adjacent to the posts. These cut-away sections of the sidewalls provide clearance for previously applied wires when the clips are applied to the posts and thus prevent pinching of the previously applied wires between the newly applied clip and a previously applied clip. Such pinching of previously applied wires would be undersirable for the reason that the insulation of the wire could be penetrated by the newly applied clip to cause a short circuit.

FIGURES 9–15 show portions of one type of hand tool for applying a terminal clip to a terminal post while simultaneously stripping the insulation from the end of a wire and electrically connecting the wire to the post. These views are shown only for the purpose of presenting a simplified and brief description of a preferred manner of applying the clip of FIGURE 1 to the post. A complete description of tools of this general type is presented in the copending application of Edwin Floyd, Serial No. 250,300 filed January 9, 1963, now U.S. Patent No. 3,189,983, and in my previously filed applications, Serial Nos. 171,074 and 302,896.

Figures 9, 10, 11, 12, 13, 14, 15:
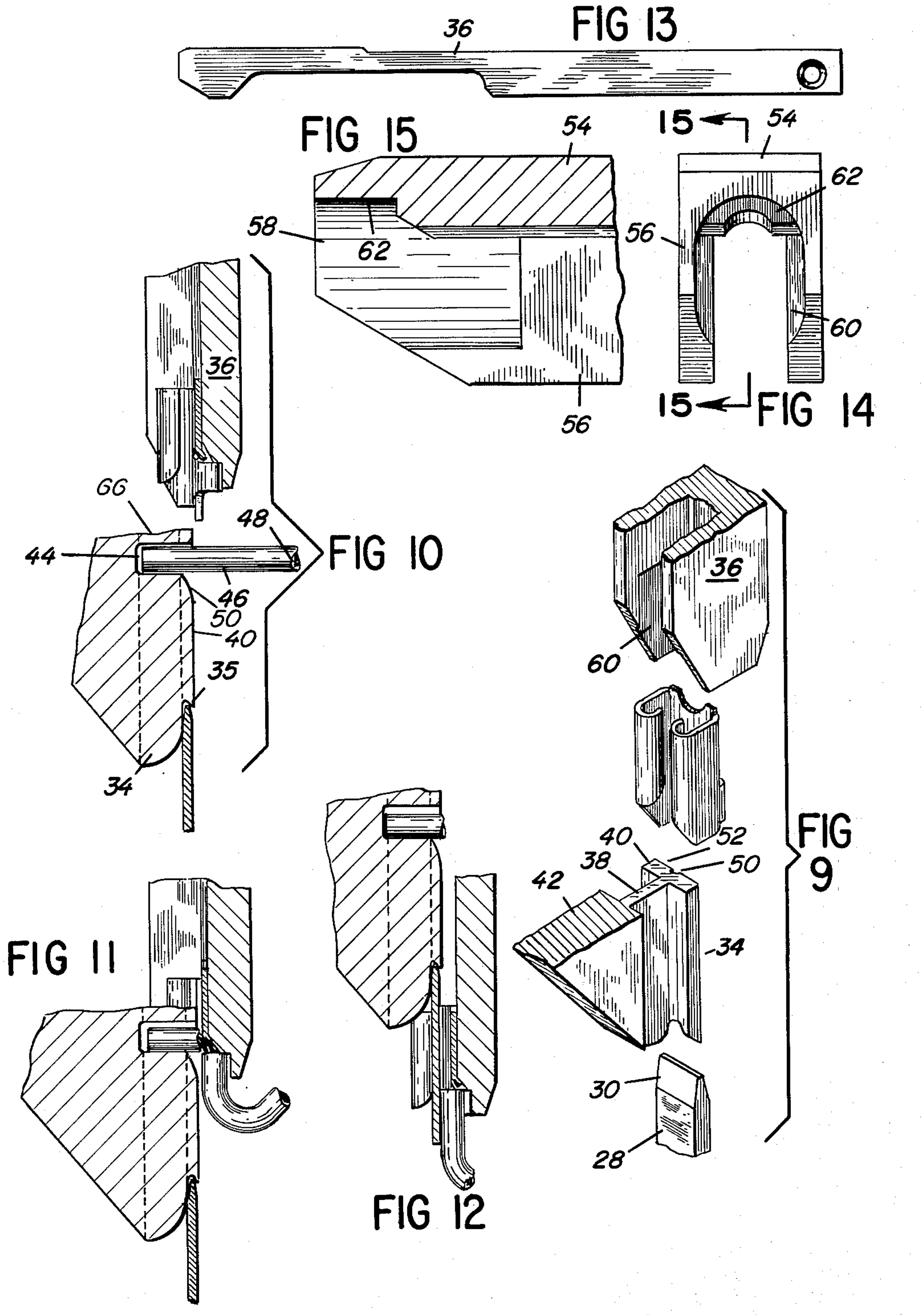
FIGURE 9 is a fragmentary perspective view showing a terminal post, a terminal clip, a mandrel over which the clip is moved during application to the post, and a clip pusher for pushing the clip onto the post.
FIGURES 10, 11 and 12 are sectional side views illustrating the application of a terminal clip to a post and the stripping of an electrical conductor during such application.
FIGURE 13 is a side view of the clip pusher.
FIGURE 14 is an end view of the clip pusher showing its leading end in which the clip is contained during application.
FIGURE 15 is a view taken along the lines 15—15 of FIGURE 14.
Figures 16, 17:
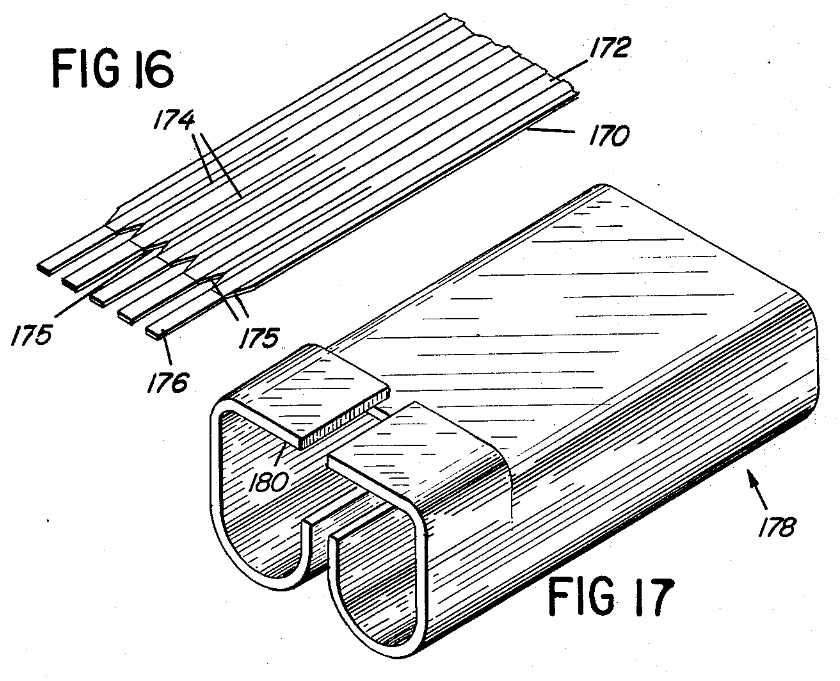
FIGURE 16 is a perspective view of a short section of flat conductor cable comprising a plurality of coplanar ribbon conductors laminated between plastic films.
FIGURE 17 is a perspective view of a modified form of terminal clip adapted to connect the individual conductors of flat conductor cable to terminal posts.
Figure 18:
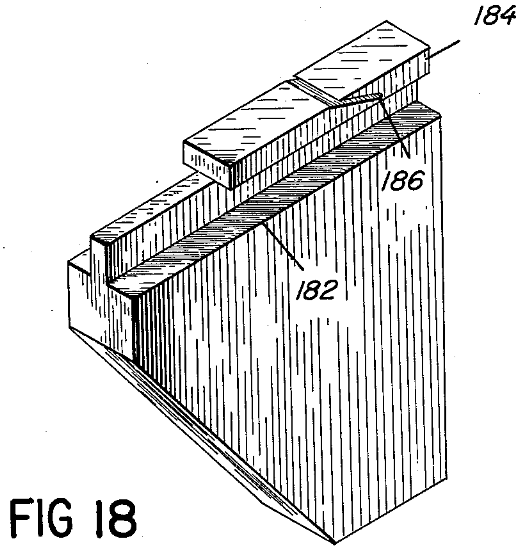
FIGURE 18 is a perspective view of a modified form of mandrel intended for usage in connecting the individual conductors of flat conductor cable to posts with the type of clip shown in FIGURE 17.
Figure 19:
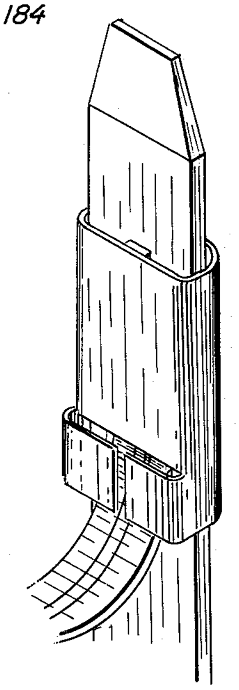
FIGURE 19 is a perspective view showing an individual flat conductor electrically connected to a terminal post by means of a clip of the type shown in FIGURE 17.

Referring now to FIGURE 9, one form of tool includes a mandrel 34 and a clip pusher 36. The mandrel extends from a mandrel block 42 and comprises a rib or web portion 38 and a head 40. The mandrel is provided with a recess 44 intermediate its ends (FIGURE 10) into which the end portion of a wire 46 is inserted and the surface of the head 40 is provided with an axial groove which tapers from this recess downwardly as viewed in FIGURES 10–13 towards the plane of the head. The edges 52 on each side of the groove 50 are preferably relatively sharp since these edges cut into the insulation of the wire during application of the clip as will be explained. The head 40 does not extend to the end of the mandrel but terminates short of the end to provide a seat 35 for the bevelled end 30 of the terminal post as shown in FIGURE 10.

The clip pusher 36 (FIGURES 13–15) is generally channel-shaped in cross section having sides 56 and a top section 54. The leading end of the pusher has an enlarged cavity 58 which conforms to the external configuration of the clip. The internal sidewalls 56 are thus cut away as shown at 60 and the top 54 is cut away on its underside as shown at 62 for the accommodation of the flaps 12 of the clip. This clip pusher is movable along a rectilinear path extending over, and past the end of, the mandrel as is evident from FIGURES 10–12.

In use, the mandrel is positioned against the end of the post as shown in FIGURE 10 and the end of the wire 46 is inserted into the opening 44. The clip pusher, in which a clip will previously have been positioned, moves over the mandrel (downwardly in FIGURES 10–12), past the recess 44, and over the end if the post until it reaches the position of FIGURE 12. During movement of the clip, the insulation support portion 12 of the clip moves against the wire and forces it against the lower side of the recess as viewed in FIGURE 11.

When the wire is forced against the lower side of the recess as viewed in FIGURES 10 and 11, the insulation of the wire is pinched between the edges 20 on the clip and the edges 52 of the mandrel. This pinching of the insulation during continuing movement of the clip causes the insulation to be circumferentially severed so that the metallic core of the wire can be dragged from the severed section of insulation, through the tapered groove 50, over the surface of the mandrel and onto the surface of the terminal post. After the terminal clip is moved to its final position on the post, the tool is removed and the clip and wire remain on the post as shown in FIGURE 1.

It has been found that for many common types of plastic insulation, the circumferential severing of the insulation will take place readily as a result of the notching or penetration of the insulation by the edges 20 and 52 coupled with the pulling force exerted on the wire which results as the clip moves over the recess. In other words, the insulation is first pinched in the plane of the surface of mandrel head 40. Thereafter, the portion of the insulation which lies outside the recess 44 is pulled away from the end portion of the insulation which is in the recess 44 so that a circumferential severing of the insulation results. Conventional vinyl insulations can be stripped easily since they have a relatively high notch sensitivity, which is to say that after they have been cut in a localized area (by the edges 20 and 52) subsequent tearing will take place readily under a relatively low stress. Other types of insulation, particularly Teflon (polytetrafluoroethylene), are more resistant to tearing than vinyl insulations and possess a somewhat lower notch sensitivity. Teflon insulation can, nonetheless, be successfully stripped in accordance with the instant invention although it may be necessary to pinch the insulation between the edges 20 and 52 a bit more tightly than a vinyl in order to induce severing.

The clip may be made of any material capable of exerting a pressure on the captured wire which is adequate to establish a satisfactory electrical connection between the wire and the post. Ordinary 70 copper-30 zinc brass clips have been found to be successful for most circumstances. Alternatively, beryllium copper or Phosphor bronze can be used under some circumstances and in environments where the possibility of intergranular corrosion (i.e., stress corrosion) exists. Since the primary current path between the conductor and the post is from the flattened end of the conductor to the post and not through the clip, the clips need not necessarily be of a highly conductive material so that steel clips are satisfactory under many circumstances. A comparative advantage of using a highly conducting material such as brass for the clips is that an alternative path for the flow of current is provided from the wire to the clip thence through the clip sidewalls to the opposite side of the post. It follows that the use of a highly conductive material for the manufacture of clips lends an added margin of reliability to the electrical connection.

The individual electrical connections on a panel board can be insulated each from the other by merely providing an insulating film or coating, for example, plastic film or insulating oxide, on the external surface of the clip at the time of manufacture. An alternative method of achieving insulated connections is to manufacture the clips from an insulating material such as a firm polycarbonate.

Regardless of the specific material from which the clips are manufactured, the clips should be dimensionally stable after application to the post in order to avoid the possibility of relaxation with an accompanying reduction of the contact pressure exerted by the clip on the wire since this contact pressure, in a large measure, determines the quality of the electrical connection. Thus, if the clips are manufactured from metal strip, the properties of the metal stock and its thickness should be such that the possibility of metallic creep will be completely avoided. If the clips are manufactured of a nonmetallic material such as a polycarbonate, the material and clip dimensions should be such that the possibility of flow with accompanying relaxation is avoided.

The relative dimensions of the terminal post and the clip are not highly critical, however, for best results certain limitations should be observed. For example, the distance between the internal opposed surfaces of the sidewalls of the clip should be slightly greater than the width of the post in order that the clip will be able to move easily onto the post when it is properly aligned therewith. The distance between the underside of the web of the clip and the edges 10 of the sidewalls should be less than the combined thicknesses of the post and wire so that the wire will be flattened as it is drawn over the mandrel and a fresh contact surface will be developed for the post-wire interface across which the current flows. The thickness of the head 40 of the mandrel is advantageously slightly less than the thickness of the post in order that a slight additional stress will be imposed on the clip as it moves from the mandrel onto the post. In other words, the clip should not partially release its pressure on the wire when it moves from the mandrel to the post but this pressure should be very slightly increased.

Figure 3:
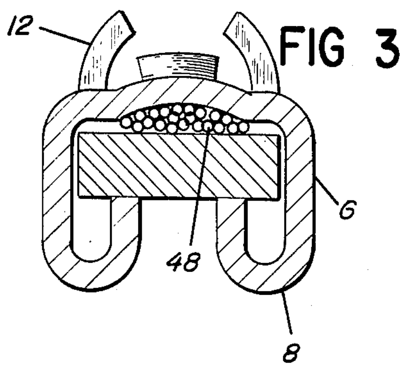
FIGURE 3 is a cross sectional view taken along the lines 3—3 of FIGURE 1.

The clip is deformed as it is moved over the mandrel in both its web portion 4 and in the sidewalls, as is apparent from a comparison of FIGURES 7 and 3. The marginal portions of the sidewalls are partially uncurled so that they extend parallel to each other after the clip has been applied to the post. The web portion of the clip is also deformed when it drags the wire strands over the mandrel surface and onto the post by being outwardly bowed beyond its initial condition. This deformation in the sidewalls and in the web should advantageously be plastic (i.e., permanent) rather than elastic; in other words, when the clip drags the wire onto the post it should be stressed beyond its elastic limit.

After a metal has been stressed beyond its elastic limit, it will further deform under a relatively low increase of applied load or stress. A further characteristic of permanently or plastically deformed metal is that it possesses limited amount of residual springiness or elasticity so that if a load is removed, it will spring back by a limited amount. When a clip in accordance with the invention is applied to a post, it is this spring back or residual elasticity in the web and the sidewalls which impose a continuing contact pressure on the wire to hold it against, and in electrical contact with, the terminal post.

Since the clip is permanently deformed during its application to the post, a single size of clip and post can be used with a relatively wide range of wire sizes or diameters. This feature of the invention is possible by virtue of the fact, noted above, that the web is outwardly deformed and stressed beyond its elastic limit when the clip is applied. Where a relatively large diameter wire is employed with a given clip and post size combination a relative high degree of plastic deformation will be imparted to the web; when a smaller wire is used with the same clip and post combination there will be a lesser amount of plastic deformation of the clip. Both the large and the small wire can be accommodated with the single size of the clip and post because of the fact that the web and sidewalls of the clip can be deformed over a wide range within the limits of the plastic deformation range of the material of the clip.

From the foregoing discussion it will be apparent that the stock material from which the clip is manufactured should be such that the clip will be plastically deformed when it is applied to the post. The thickness of the stock of the clip should also be such that the wire will be flattened during application to produce a flat contact surface for engagement with the surface of the post.

The quality of the electrical connections formed in accordance with the invention has been found to be very good. It is believed that a contributing factor to the effectiveness of the electrical connections formed is the fact that the wire is flattened against the surface of the mandrel thereby to expose fresh metal surface at the electrical interface. The movement of the wire over the post also has the effect of abraiding the surface of the post and cleaning any oxide or other foreign matter therefrom to further contribute to the quality of the connection. For best engineering practice, the length of the clip should be such that the interfacial contact area between the post and the wire is equal to about two or more times the cross-sectional area of the wire. Where space limitations impose a severe limitation on the length of the clip, however, this ratio can be less than two to one if the clip is designed to impose a sufficiently high pressure on the wire.

A significant feature of the invention which will be apparent from the description presented thus far is that the terminal clip itself performs an active role in the dragging of the wire across the mandrel and onto the post and in so doing adapts itself to the particular wire being used. In effect then, during the application of the clip to the post, the clip functions as that part of the tool which applies pressure to the wire. After application, when the tool is removed from the post the clip then assumes a passive role of maintaining the wire in electrical contact with the post.

An additional significant feature of the invention is that the force which pushes the clip past the wire, over the mandrel, and onto the post is not directly relied upon to establish the contact force applied by the clip to the wire-post interface. The significance of this feature is that after removal of the applying force, there is no resulting relaxation as is the case with, say, a conventional crimped connection. This aspect of the invention can be understood from an inspection of FIGURES 9–12. The clip applying force is transmitted from the clip pusher to the upper end of the clip; in other words, in FIGURE 10–12 the clip pusher applies a downwardly directed axial force to the clip as it pushes the clip from the position of FIGURE 10 to the position to FIGURE 12. The contact force, however, is developed during movement of the clip over the mandrel and onto the post by deformation of the clip as it drags the wire from the recess 44 and over the surface of the mandrel. This contact force is directed normally of the axis of the clip and post and is developed in the clip itself during its movement past the wire. Thus, after the clip pusher is removed from the clip in FIGURE 12, the contact force will remain unchanged since it is not directly dependent upon the applying force supplied by the clip pusher.

A connection in accordance with the invention has the advantage of being secure and permanent on the one hand but being capable of being easily and quickly broken for repair of circuit modification. Referring to FIGURE 2, if it is assumed that the conductor extending from the lowest clip must be disengaged from the terminal post, it is only necessary to pry off the lowest clip by any suitable tool such as a pair of long-nosed pliers. It should be noted that the removal of the lower connection in FIGURE 2 thus does not require that the upper connection be disturbed. The clip of the upper connection can be slid downwardly on the post if it is later desired to make a further connection to the same post.

When the electrical connection is formed by movement of the clip over the mandrel and past the wire, it will be apparent that relatively high stresses will be imposed on the mandrel, on the clip, and on the wire for the reason that a substantial amount of force is required to penetrate and tear the insulation, to flatten the wire, and to deform the clip. The work required to perform these operations, however, is carried out while the clip and wire are on the mandrel so that by the time the clip moves onto the post the stresses will have been substantially reduced. This means that the post itself is not subjected to the relatively high stresses developed during the insulation stripping and wire deforming operations. This feature of electrical connections in accordance with the invention is of particular significance where relatively small posts (for example 0.025" wide) are involved since such posts are subject to bending or other damage if unduly high loads are imposed on them.

Several types of hand tools and program controlled wiring machines have been developed for forming electrical connections in accordance with the invention. Reference is made to my previously filed application Serial Number 171,074, which shows a relatively simple hand tool and one form of fully automatic wiring machine for the automatic wiring of panelboards having a multiplicity of terminal posts mounted therein. Application Serial Number 293,602, filed July 9, 1963 by John R. Vickery, now U.S. Patent No. 3,186,077, shows an alternative type of wiring machine also adapted to wiring operations for panelboards.

Terminal clips in accordance with the present invention can also be used to connect the individual conductors of flat conductor cable to terminal posts as is shown in FIGURES 16–19. Flat conductor cable 170 comprises a plurality of relatively wide and thin metallic conductors 172 which are laminated between thin sheets of suitable insulating film such as Mylar (polyethylene terephthalate resin). When the conductors 172 are to be connected to a terminal post, the insulating sheets are stripped from the ends of the cable to leave the exposed ends 176 of the conductors. Additionally, the insulating films which are bonded to each other are slit or cut as shown at 174 between adjacent conductors for a short distance from the ends of the cable. Advantageously, the insulating films are tapered on each side of each conductor as shown at 175 towards the slits or cuts provided between the conductors.

Figure 21:
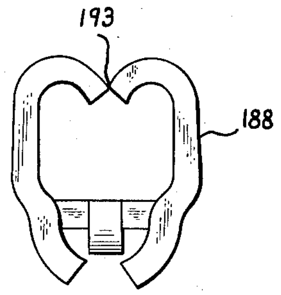
FIGURE 21 is an end view of the clip of FIGURE 20.
Figure 23:
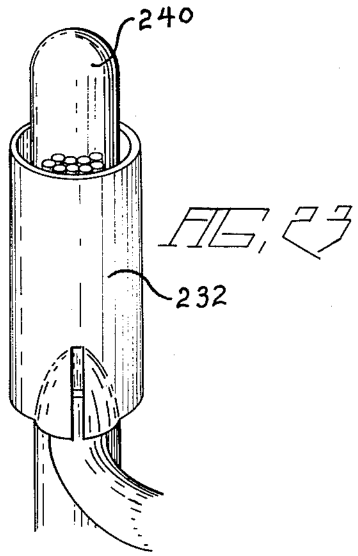
FIGURE 23 is a view showing an electrical connection between a cylindrical post and a wire formed with the clip of FIGURE 22.

A suitable terminal clip 178 for connecting the conductors 172 to a post is substantially similar to the clip shown in FIGURE 21 except that it has a flat web. The clip 178 is provided with insulation supports 180 comprising struck-up ears which extend parallel to, but spaced outwardly from, the web since these ears in this instance engage the flat cable and hold it against the post. The connection may be formed with a tool as previously described and equipped with a mandrel 182 having a head 184. This mandrel, which is particularly adapted for flat conductor, is provided with a slot 186 which slopes inwardly and rearwardly of the mandrel from the upper surface of the head 184. Advantageously, the width of the head 184 is less than the center-to-center distance of the conductors 172 of the cable. In use, a stripped end 176 of a conductor is positioned in the slot 186 so that the tapered portions 175 of the insulation will extend laterally beyond the surface of the head 184. The clip 178 is moved over the mandrel, past the slot 186, and onto the terminal post so that it will drag the end of the conductor over the surface of the mandrel and onto the post to produce the electrical connection of FIGURE 41. As with previous embodiments, the formation of the electrical connection requires only that the stripped end of the conductor be inserted into the tool, the tool be placed against the end of the post, and the clip moved by the clip pusher over the mandrel and onto the post.

Figure 20:
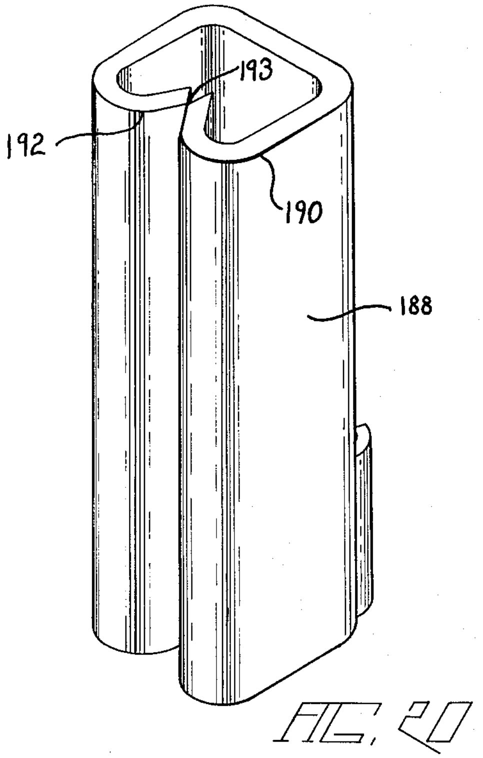
FIGURE 20 is a perspective view of a further alternative form of connector clip.

FIGURES 20 and 21 show a further embodiment of a terminal clip in accordance with the invention which is particularly adapted for usage with terminal posts having a square cross section and relatively small terminal posts, for example, posts having a square cross section with 0.025" sides. The clip 188 (FIGURE 20) is in many respects similar to the previously described clips but differs in that the curled marginal portions 192 of the sidewalls 190 are disposed against each other as indicated at 193. With this type of clip, the edges of the sidewalls are located adjacent to the center of the post after application. This arrangement is preferable for relatively small clips since the edges are located the maximum distance possible from the sides of the post and there is less of a possibility that the clip will be accidentally dislodged. Where the post has sides as small as 0.025", it is desirable to use clips of this type for the reason that if a clip of the type shown in FIGURE 4 is used the edges of the sidewalls will be located very near the sides of the post and may become accidentally dislodged from the post. The type of clip shown in FIGURE 20 is also preferable for usage with square posts, regardless of the size, for the reason that clips for usage with such posts will necessarily have relatively wide sidewalls as compared with the type of clip shown in FIGURE 4. Again, accidental dislodgment of the clip can take place because the wide sidewall provides a relatively long lever arm and the clip can accidentally be dislodged by bending of the sidewall.

Terminal clips of the type shown in FIGURES 20 and 21 are advantageously applied to the terminal post by means of a specialized type of tool having a mandrel which functions to open up the seam between the adjacent portions 193 of the sidewalls prior to movement of the terminal clip against the wire. After the clip has been against the wire, it is moved between a pair of convergent sidewalls on each side of the mandrel which function to bend the sidewalls back towards each other until their edges again abut each other.

Figure 22:
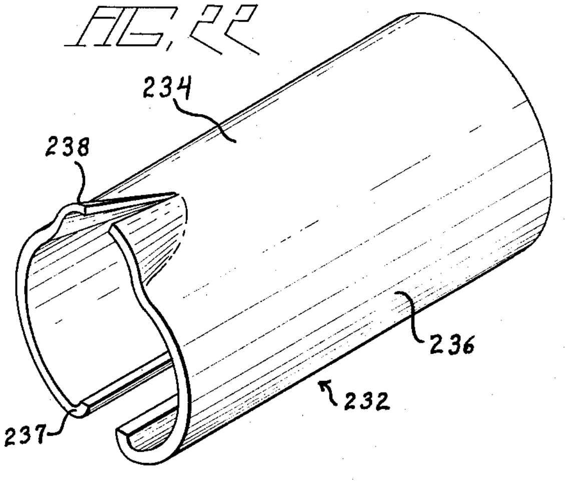
FIGURE 22 is a perspective view of a terminal clip in accordance with the invention intended for usage with a cylindrical, rather than a rectangular, post.

The terminal posts presently used are usually of square or rectangular cross-section and the terminal clips disclosed above have interior cross sections conforming to these presently available posts. The invention, however, can be employed where cylindrical posts are used and, in fact, there are certain advantages to be realized from cylindrical posts. FIGURE 22 shows a substantially cylindrical clip 232 intended for usage with cylindrical post 240. The web 234 of the clip 232 merges with the sidewalls 236 which are provided with an axially extending open seam 237. The opposed edges of the sidewalls may be slightly inwardly curled if desired. The clip 232 is provided with an insulation support 238 at one end of the web as with the previous embodiments. The clip 232 is applied to the post in substantially the same manner as the previously described embodiments, that is by means of a tool having a mandrel with a recess for reception of the wire. A suitable mandrel for the clip of FIGURE 22 would, of course, have a head of cylindrical cross-section. It is advantageous to curl the opposed edges of the sidewalls slightly inwardly so that they are directed towards the web 234 as with previous embodiments in order to increase the force applied to the wire. In this instance, the curled sidewalls may be stressed when they are moved onto the post as with previous embodiments. One of the advantages obtained by the use of cylindrical posts is that such posts do not have sharp edges which might cause cutting or nicking of wires extending between pairs of posts. Furthermore, closer spacing and a resulting higher post density can be achieved if the posts are cylindrical rather than rectangular in cross section.

Change in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. A terminal clip for holding a conductor against, and in electrical contact with, a terminal post, said clip comprising a web portion, a pair of post-embracing sidewalls extending from opposite longitudinal edges of said web, conductor supporting and strain relief means between said sidewalls at one end of said web, said supporting and strain relief means comprising a pair of struck-up flaps on opposite sides of the longitudinal axis of said web, said flaps being integral with said web on each side of said axis along lines extending parallel to said axis, said flaps forming a recess on the underside of said web between said sidewalls, an outwardly deformed portion at said one end of said web, said outwardly deformed portion being between said flaps and sloping towards the plane of said web and forming a lead-in surface adjacent to said recess for said conductor, and sharp edges on each side of said lead-in surface, said sharp edges being formed by edge portions of said web adjacent to said flaps and being adapted to cut into insulation on said conductor during movement of said clip onto said post, said clip being adapted to be assembled to a terminal post with said conductor extending parallel to the axis of said post and confined between said underside of said web and said post, and with said conductor extending from confined relationship through said recess.

2. A terminal clip as set forth in claim 1 wherein said sidewalls each have longitudinal marginal edge portions which are normally in abutting relationship with each other.

3. Electrical connecting means for connecting at least two conductors to a single terminal post, said post being straight and having a substantially uniform cross-section throughout its length, said post having a fixed end and a free end, said connecting means comprising a first clip on said post, said first clip having a web portion and having sidewalls extending from its longitudinal edges, said sidewalls extending partially around said post whereby said clip is in embracing relationship to said post, a first one of said conductors being contained between said web and one side of said post and extending axially, along said post, towards said fixed end, said conductor emerging from confined relationship at the one end of said clip which is proximate to the base of said post, a second clip on said post, said second terminal clip being identical to said first clip and being mounted on said post above said first clip, said second clip holding a second conductor against, and in electrical contact with, said post in the same manner as said first conductor is held by said first clip.

References Cited by the Examiner

UNITED STATES PATENTS

| | | | |
|---|---|---|---|
| 2,134,775 | 11/1938 | Bergan | 339—97 X |
| 2,651,764 | 9/1953 | Felts et al. | 339—276 X |
| 2,780,794 | 2/1957 | Cresson | 339—276 |
| 2,888,662 | 5/1959 | Hammell | 339—276 X |
| 3,021,503 | 2/1962 | Hopkins et al. | 339—213 |
| 3,040,150 | 6/1962 | Rueger | 339—95 X |
| 3,065,449 | 11/1962 | Matthysse et al. | 339—273 X |
| 3,122,604 | 2/1964 | Cook et al. | 339—256 X |
| 3,128,143 | 4/1964 | Sitzler | 339—223 |

PATRICK A. CLIFFORD, *Primary Examiner.*

W. DONALD MILLER, *Examiner.*